(12) United States Patent
Wong (10) Patent No.: US 10,139,309 B2
(45) Date of Patent: Nov. 27, 2018

(54) COLLISION SENSOR (71) Applicant: Dragon Crown Industries Limited, Shatin (HK)

(72) Inventor: Wing Yieu Michael Wong, Shatin (HK)

(73) Assignee: DRAGON CROWN INDUSTRIES LIMITED, Shatin (HK)

( * ) Notice: Subject to any disclaimer, the term of this patent is extended or adjusted under 35 U.S.C. 154(b) by 163 days.

(21) Appl. No.: 15/219,801

(22) Filed: Jul. 26, 2016

(65) Prior Publication Data
US 2018/0031441 A1  Feb. 1, 2018

(51) Int. Cl.
*H01H 13/14* (2006.01)
*G01M 7/08* (2006.01)
*A47C 31/00* (2006.01)
*A47B 9/00* (2006.01)
*A47C 1/02* (2006.01)
*A47C 7/62* (2006.01)
*A47C 17/04* (2006.01)
*H01H 13/28* (2006.01)
*G01L 5/00* (2006.01)

(52) U.S. Cl.
CPC .............. *G01M 7/08* (2013.01); *A47B 9/00* (2013.01); *A47C 1/02* (2013.01); *A47C 7/62* (2013.01); *A47C 17/04* (2013.01); *A47C 31/00* (2013.01); *G01L 5/0052* (2013.01); *H01H 13/14* (2013.01); *H01H 13/28* (2013.01)

(58) Field of Classification Search
CPC ............................... H01H 13/14; H01H 13/28
See application file for complete search history.

(56) References Cited

U.S. PATENT DOCUMENTS

| | | | | |
|---|---|---|---|---|
| 2,748,216 A * | 5/1956 | Schneider | .............. | H01H 13/28 200/430 |
| 3,797,630 A * | 3/1974 | Zilkha | ........................ | B41J 5/08 235/145 R |
| 5,824,978 A * | 10/1998 | Karasik | ................ | H01H 13/702 200/18 |
| 8,048,039 B2 * | 11/2011 | Carlyon | ............ | A61M 25/0606 251/149.1 |

(Continued)

*Primary Examiner* — Justin Olamit
(74) *Attorney, Agent, or Firm* — Muncy, Geissler, Olds & Lowe, P.C.

(57) ABSTRACT

A collision sensor, including a hollow housing having an accommodation space; a collision information generator arranged in the space and adapted to produce an output indicating a directional and/or positioning information of the collision when being triggered during the collision; a collision detecting member arranged over and adapted to trigger the collision information generator upon being driven by the obstacle during the collision; wherein the collision detecting member and the collision information generator are spaced apart from or in contact with each other by one or more resilient members, by which the collision detecting member is switchable between a normal position at which the collision detecting member is spaced apart from the collision information generator, and a working position at which at least a portion of the collision detecting member trigger the collision information generator by a compressive/collision force from the obstacle during the collision.

15 Claims, 5 Drawing Sheets (56) References Cited

U.S. PATENT DOCUMENTS

| | | | | |
|---|---|---|---|---|
| 8,201,877 | B2* | 6/2012 | Hsieh | A47C 1/0242 |
| | | | | 297/330 |
| 8,222,545 | B2* | 7/2012 | Tsai | G06F 3/0202 |
| | | | | 200/5 A |
| 9,681,752 | B1* | 6/2017 | Williams | A47C 7/62 |
| 2015/0170854 | A1* | 6/2015 | Nishino | H01H 13/7073 |
| | | | | 200/5 A |

* cited by examiner

COLLISION SENSOR

TECHNICAL FIELD

The present disclosure relates to collision sensors, and more particularly, to a collision sensor adapted for use with a moving part/object to prevent the moving part from damaging the obstacle or hurting people or pets encountered during its motion.

BACKGROUND ART

There are various safety bumpers and collision sensors adapted to be mounted on automatically moving objects or parts to serve as collision protection. A typical area of application is the safeguarding of pinching and shearing edges in mechanical engineering, in stage machinery, medical technology and on large, heavy gates. They can be also used on automated guided vehicles, or even on domestic and commercial furniture.

For example, a collision sensor might be used to detect if a surface or a part is being collided with or impacted by an obstacle. The sensor might be installed in an automatically movable part of a power driven furniture, such as a chair/sofa or table to detect collision. The automatically movable part refers to a part of furniture or fixture which is not driven manually, and might be driven by a spring mechanism, a hydraulic or pneumatic mechanism, a motor-driven gear or the like, as well known in the art.

In a motor driven furniture, such as a chair/sofa, it is important to prevent the moving part from damaging obstacles or hurting people or pets located nearby. In this regard, a collision sensor is required to signal the motor controller to stop moving when an obstacle is hit. The most commonly used collision sensors are in strip form, but such strip form sensors are expensive and could only detect collision occurred on a relatively small area, such as the edges of the furniture.

BRIEF SUMMARY OF INVENTION

There is disclosed a collision sensor for detecting a collision with an obstacle, comprising: a hollow housing, preferably made of plastic and formed by injection, having a base plate and one or more lateral walls defining an accommodation space; a collision information generator arranged in the space and adapted to produce a output indicating a directional and/or positioning information of the collision when being triggered during the collision; a collision detecting member arranged over and adapted to trigger the collision information generator upon being actuated and driven by the obstacle during the collision; wherein the collision detecting member and the collision information generator are spaced apart from or in contact with each other by one or more resilient members arranged in the space, by which the collision detecting member is switchable between a normal position at which the collision detecting member is spaced apart from or in contact with the collision information generator, and a working position at which at least a portion of the collision detecting member is pressed against, deform and trigger the collision information generator by a compressive/collision force originated from the obstacle during the collision.

In some embodiments, the collision information generator preferably comprises a plurality of signal switching/generation elements arranged in a predetermined pattern/manner, preferably in a peripheral pattern/manner, and being operable in response to the collision, and its signal switching/generation operations carrying and providing a directional/positional information of the collision.

In some embodiments, the collision information generator might comprise a printed circuit board assembly mounted on the base plate and provided with one or more conductive members/traces; and a key member having one or more deformable contacting portions being corresponding to and matching with the conductive members/traces, wherein each of the deformable contacting portions is switchable between a normal state at which the contacting portion is spaced apart from respective conductive members/traces, and a deformed state at which at least a portion of the contacting portion is deformed to press against and short the respective conductive members/traces by a compressive force originated from the collision with the obstacle to produce the output indicating a directional and/or positioning information of the collision.

In some other embodiments, the collision information generator might comprise a printed circuit board assembly mounted on the base plate and provided with one or more tact switches triggerable by a compressive force originated from the collision with the obstacle to produce the output indicating a directional and/or positioning information of the collision.

In some embodiments, the collision detecting member and/or the collision information generator might comprise one or more engagement notches arranged at its periphery for engaging with one or more complementary stoppers arranged in the housing to prevent the collision detecting member and/or the collision information generator from rotating while being subjected to a torque generated by a compressive force originated from the collision with the obstacle.

In some embodiments, the collision detecting member might comprise an enlargement element, preferably in form of a rectangular, square, polygonal, or circular and planar, concave, or convex plate and preferably made of plastic by thermoforming, for enlarging a detection area for collision, preferably by 2-40 times than an original coverage area of the collision detecting member.

In some embodiments, the collision detecting member might be in form of a circular cover, preferably made of zinc alloy by die-casting, comprising a circular groove arranged at its periphery to accommodate and engage with the one or more resilient members and a circular protrusions for engaging with the collision information generator and deforming or driving the collision information generator to produce the output indicating a directional and/or positioning information of the collision.

In some embodiments, the resilient member is a wave spring, preferably enclosing the collision information generator.

In some embodiments, the key member is a silicone rubber key, preferably formed with compression molding, having a circular conductive contacting portions arranged at its one side, and preferably coated with a conductive film, for contacting and shorting the respective conductive members/traces; and a central conical portion arranged at its another side and having its apex engaged with the collision detecting member and/or flushed with an end surface of the wave spring.

In some embodiments, the one or more conductive members/traces or tact switches might be indexed and/or grouped to correspond to or represent respective zones of the collision detecting member and/or the enlargement element, such that a directional and/or positioning information of the collision could be provided when respective conductive members/traces are shorted or tact switches are triggered.

There is disclosed further a device for detecting collisions of an automatically moveable part of a furniture with obstacles, comprising:
- a piece of the furniture with at least one moveable part adapted to be movable relatively to remaining pieces of the furniture in a non-manual manner;
- an automatic driving mechanism adapted to move the moveable part;
- a controller adapted to control the automatic driving mechanism, and
- a sensor according to anyone of foregoing embodiments adapted to detect a collision with an obstacle during movement of the moveable part and collect a directional and/or positioning information of the collision and then transmit a output indicating the collision to the controller to adjust the automatic driving mechanism when the collision occurs.

BRIEF DESCRIPTION OF DRAWINGS

The disclosure will be described by way of example with reference to the accompanying drawings, in which.

DETAILED DESCRIPTION OF INVENTION

Some preferred embodiments of the present disclosure are set forth below in conjunction with the accompanying drawings, so as to illustrate in details the technical solutions thereof.

Referring to FIGS. 1a-1c, 2, and 3a-3c, several schematic views, exploded views, sectional views, and partially enlarged views of various example collision sensors of the present disclosure are shown. The example collision sensor 100 of FIG. 1a comprise an output connector 10 with cables for communication with an external controller, and a connector protection cover 20 enclosing and securing the output connector 10 and forming a snap fit with a rear part or a base plate 30 of a housing 40. The housing further comprise one or more lateral walls defining an accommodation space to accommodate at least one of the followings: a printed circuit board assembly (PCBA) 50, a key member 60, one or more resilient member 70, and/or a cover or actuator 80. Though the housing as shown is shaped as a rectangular box with 4 lateral walls, it could be in form of a cylindrical box with 1 lateral/peripheral wall, or a polygonal box with multiple lateral walls.

Figure 1A:
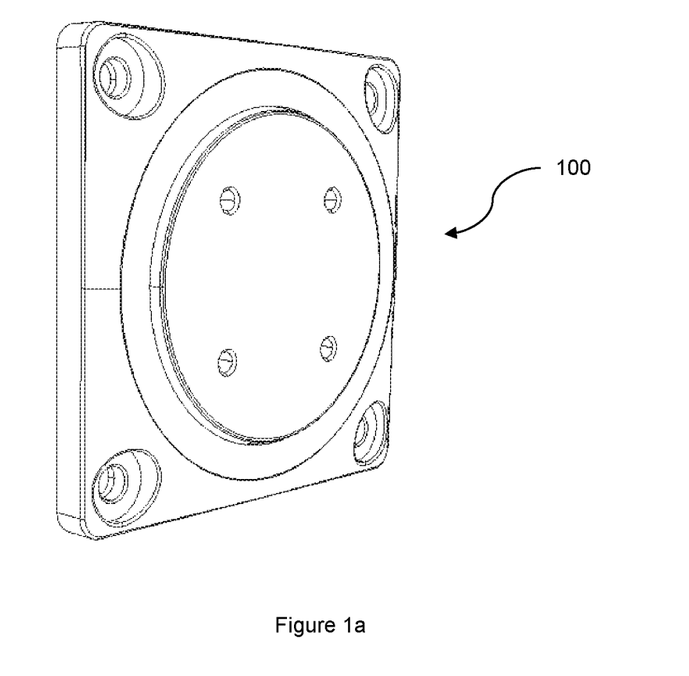
FIG. 1a is a schematic view of an example collision sensor of the present disclosure.
Figure 1B:
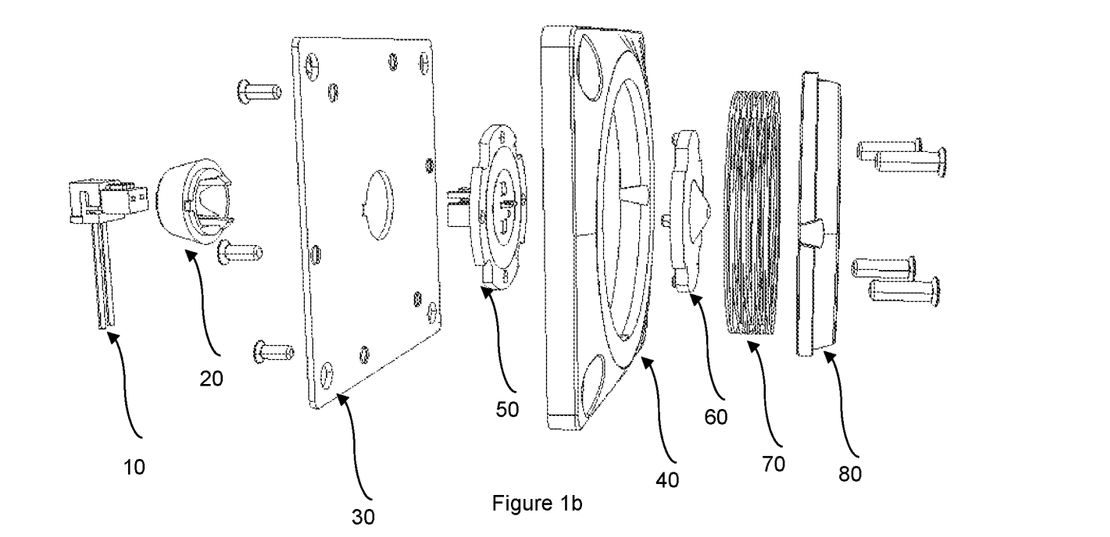
FIG. 1b is an exploded view of the example collision sensor of the present disclosure.
Figure 1C:
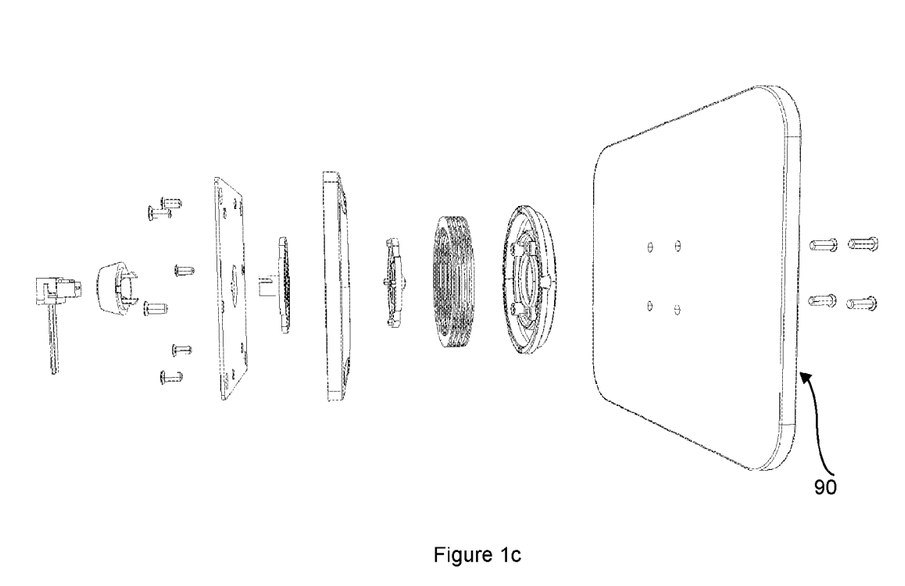
FIG. 1c is an exploded view of another example collision sensor of the present disclosure having an optional enlargement plate.
Figure 2:
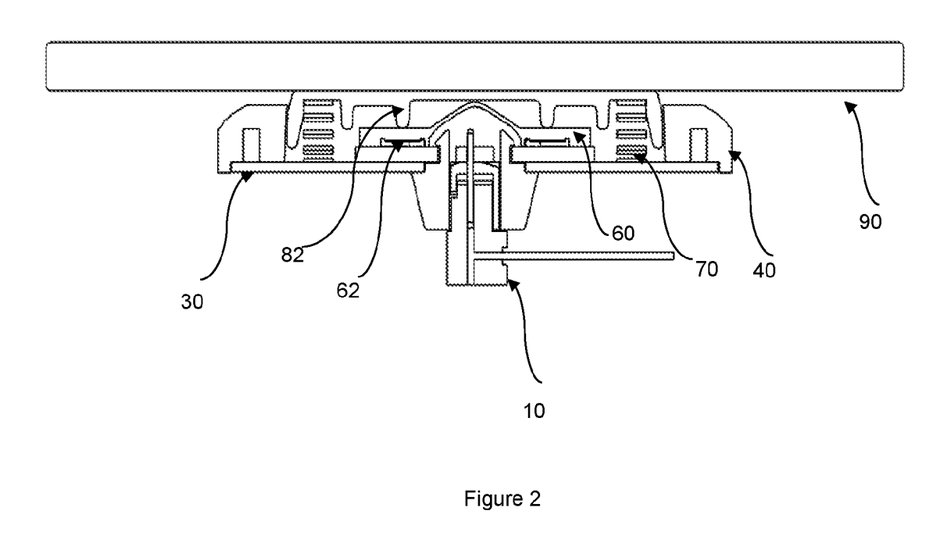
FIG. 2 is a schematic sectional view of an example collision sensor of the present disclosure.

The printed circuit board assembly (PCBA) 50 and the key member 60 form collectively a collision information generator adapted to produce an output indicating the occurrence of a collision and an optional directional and/or positioning information of the collision when being triggered or driven during the collision.

The printed circuit board assembly (PCBA) 50 and the key member 60 are respectively and substantially in form of a circular plate. The PCBA 50 has a first/distal side in contact with the base plate 30 and a second/proximal side in contact with the distal side of the key member 60. The proximal side of the PCBA 50 is provided with multiple pairs of parallel conductive members/traces or gold fingers 52, 54 of opposed polarity being extended radially and arranged circumferentially on the PCBA 50, or two parallel conductive members/traces or gold fingers 52, 54 of opposed polarity being meanderingly and circumferentially extended respectively from two terminals located at a central portion of the PCBA 50 and connected with the output connector 10, and the distal side of key member 60 is correspondingly provided with a circular groove 62 with a flat bottom on which a conductive film or preferably a carbon film is coated. The circular carbon film is positioned right above the conductive traces 52, 54 of opposed polarity and spaced apart from them while in a normal or idle state of the collision information generator. When a collision occurs, the groove 62 will be driven to deform and the carbon film will then make contact with and short at least two adjacent conductive traces 52, 54 of opposed polarity, whereby changing the resistance, capacitance, and/or inductance there between and producing an output to indicate the occurrence of the collision with an obstacle. When the obstacle is removed and the groove restores its shape, the conductive traces are no longer shorted by the carbon film and the change or restoration of the resistance, capacitance, and/or inductance will now indicate the end of the collision.

The proximal side of the key member 60 comprises a conical portion 64, which makes contact with and being kept in place by the cover or actuator 80. The cover or actuator 80 forms or serves as a collision detecting member adapted to trigger the collision information generator upon being actuated and driven by the obstacle during the collision.

Figure 3A:
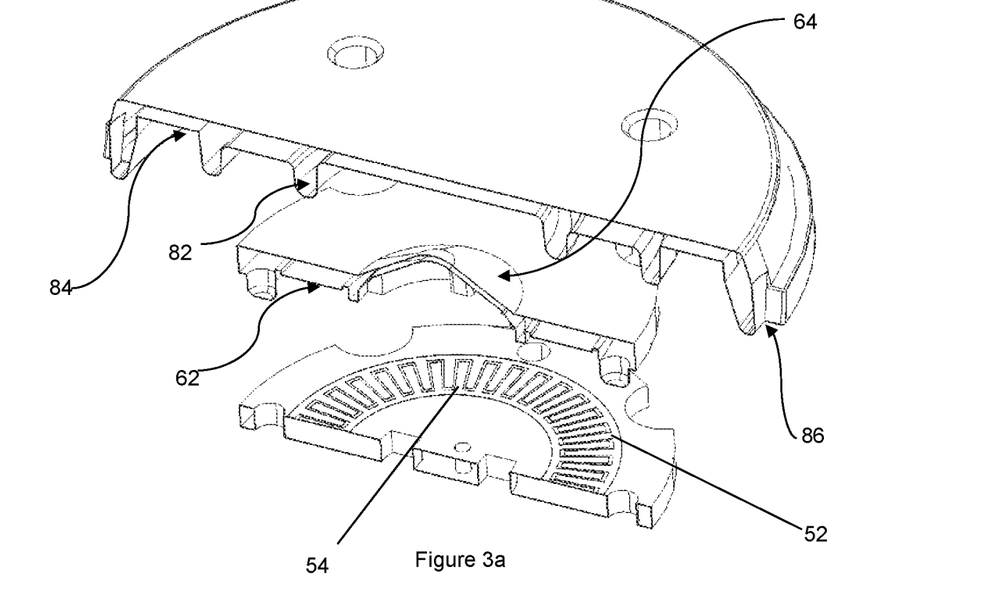
FIGS. 3a-3c are partially enlarged views of core features and their operations of an example collision sensor of the present disclosure.
Figure 3B:
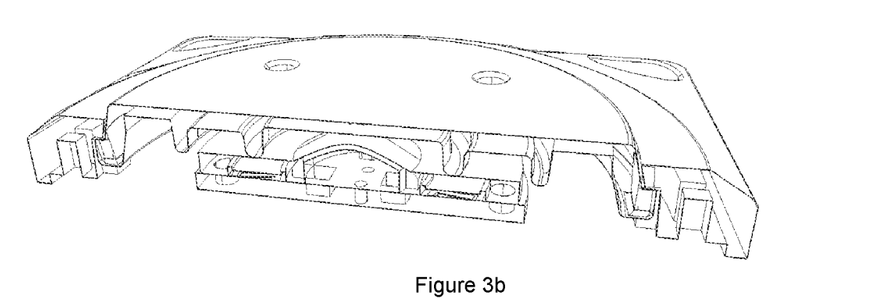
Figure 3C:
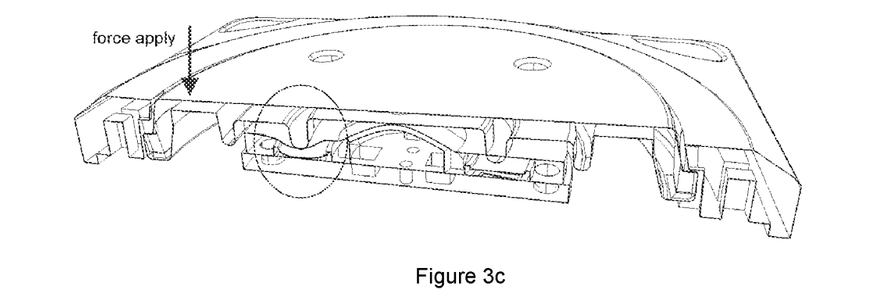

Referring to FIGS. 3a-3c, the proximal side of the actuator 80 comprise a substantially planar surface for engaging with an optional detection enlargement element 90 as will be described below in further details. The distal side the actuator 80 comprise an annular groove 84 arranged at its periphery to accommodate and engage with the one or more resilient members 70 arranged in a circumferential manner; and multiple circumferential protrusions or an annular protrusion 82 for engaging with the key member 60 of the collision information generator and deforming or driving the collision information generator to produce the output indicating the occurrence and an optional directional and/or positioning information of the collision. The annular protrusions 82 are positioned with respect to the circular groove 62 of the key member 60. In particular, they have the same center and similar diameters. In some embodiments, the one or more resilient members 70 is preferably replaced by a wave spring, which might enclose the collision information generator. The employment of the wave spring enhance the compactness of the collision sensor as it has a reduced spring operating height and spring cavity.

Referring to FIG. 3c. When a collision occurs or a force is applied to the actuator 80 and overcomes the resilient force of the wave spring, the actuator is tilted, and then at least a portion of the annular protrusion 82 or at least one of circumferential protrusions will be driven to press against and deform the respective portion of the bottom of the circular groove 62, such that the conductive film of the circular groove 62 will make contact with and short the conductive traces 52, 54 to produce an output indicating the occurrence of the collision. When the obstacle is removed, the resilient force provided by the wave spring will urge the actuator 80 to restore its former position and the groove 62 to restores its original shape, the conductive traces 52, 54 are no longer shorted by the carbon film in the groove 62 as they are now spaced apart from each other again, and the change or restoration of the resistance, capacitance, and/or inductance detectable by the external controller connected via the output connector 10 will indicate the end or completion of the collision.

In some embodiments, the housing 40 is preferably a plastic housing made of nylon with fiber for its hard, tough, rigid, and self-lubrication properties, and formed by injection. In some embodiments, the base plate 30 is a rigid steel plate, such as SPCC, and formed by punching. The key member might be a silicone rubber key made of silicone rubber shore A 60-70 and formed by compression molding. The actuator 80 might be made of a zinc alloy and formed by die-casting. The enlargement/detection plate might be made of plastic sheet and formed by thermoforming.

Figure 4A:
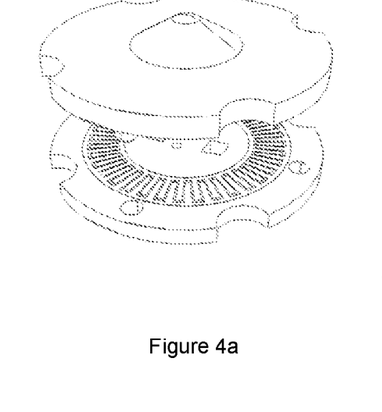
FIGS. 4a-4b are schematic views of interchangeable collision information generation mechanism of two example collision sensors of the present disclosure.
Figure 4B:
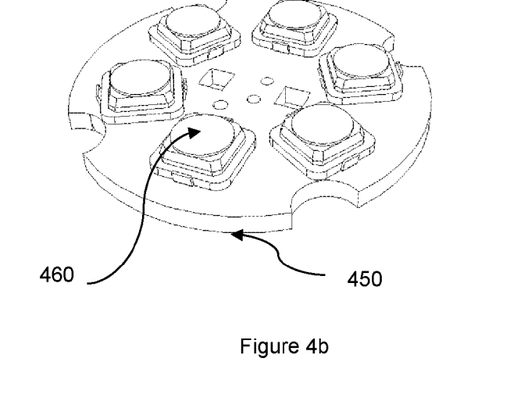

Referring to FIGS. 4a-4b, which depict respectively two example interchangeable collision information generation mechanism of the collision sensor of the present disclosure. In the example collision sensor shown in FIG. 4a, the multiple pairs of parallel conductive members/traces or gold fingers 52, 54 of opposed polarity or the meandering and circumferential conductive members/traces or gold fingers on the PCBA 50 are indexed and/or grouped, and each group of conductive members is corresponding to or representing respective zones of the collision detecting member and/or the detection enlargement element 90. For example, the group of conductive members located at left hand side represents the western/left portion of the actuator 80 or the detection enlargement element 90, when they are shorted during a collision, then the obstacle is determined to be located at left hand side of the collision sensor. In some embodiments, the collision sensor might further comprise a timer, a gyroscope, a pressure sensor and/or an acceleration sensor (not shown) to provide a relatively accurate information on the location of the obstacle as the collision point on the actuator 80 or the detection enlargement element 90 could be computed based on the temporal, directional, pressure, and/or acceleration data obtained by the timer, the gyroscope, the pressure sensor and/or the acceleration sensor, such that a temporal, directional, and/or positioning information of the collision could be provided in a more accurate manner. In the example collision sensor shown in FIG. 4b, the PCBA 50 and the key member 60 of FIG. 4a are replaced by an alternative mechanism comprising a PCBA 450 and one or more small tact switches 460 in order to provide a desirable operation and response time. Similarly, the triggering of any one of those indexed and grouped tact switches 460 might enable the provision of relevant directional and/or positioning information of the collision in a similar manner as the collision information generation mechanism of FIG. 4a does. In some other embodiments, there are 2, 4, 8, 16, 36 or more tact switches, rather than 6 tact switches as shown in FIG. 4b.

Figure 5:
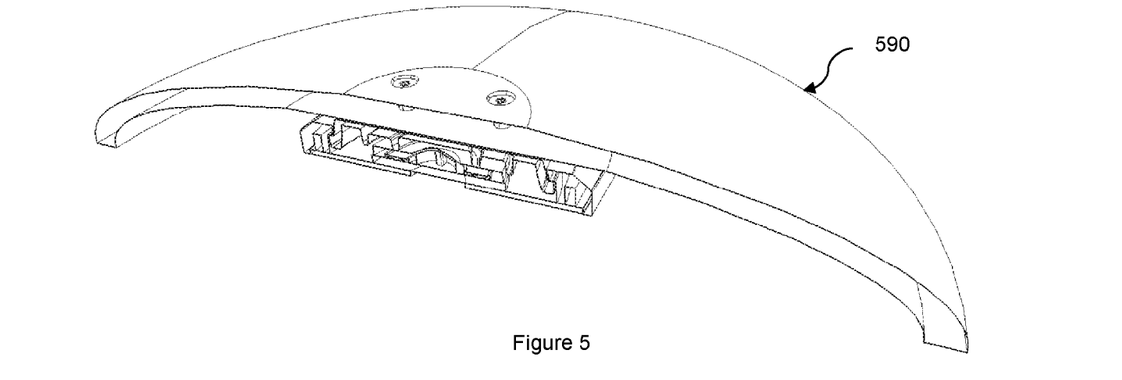
FIG. 5 is a schematic view of a detection enlargement element/plate of another example collision sensor of the present disclosure

Referring to FIG. 5, the example collision sensor comprises an optional convex or dome shaped detection enlargement element 590, which not only increase the detection coverage or area, but also enable the collision sensor to be used in various application and used on various devices or objects. The enlargement element of various shape could also conceal the collision sensor as it could be shaped to fully comply with the outlook or appearance of a specific device or object employing the present disclosure. It could be mounted at corners, the front part, the rear part, or lateral part of the specific device or object by making use of only one mounting point. In addition, it could be embedded into the housing and forms a part of the housing of the specific device or object as its main body or essential part is relatively small in size, and its width, length and height might range from dozens/hundreds of millimeter to several centimeters. In some embodiments, the surface area or coverage area for collision detection of the enlargement element 590 is larger than the same of the actuator 80 by 30 times or above, and the exact enlargement figure will depend at least on the material and the strength of the detection enlargement element 590.

Figure 6:
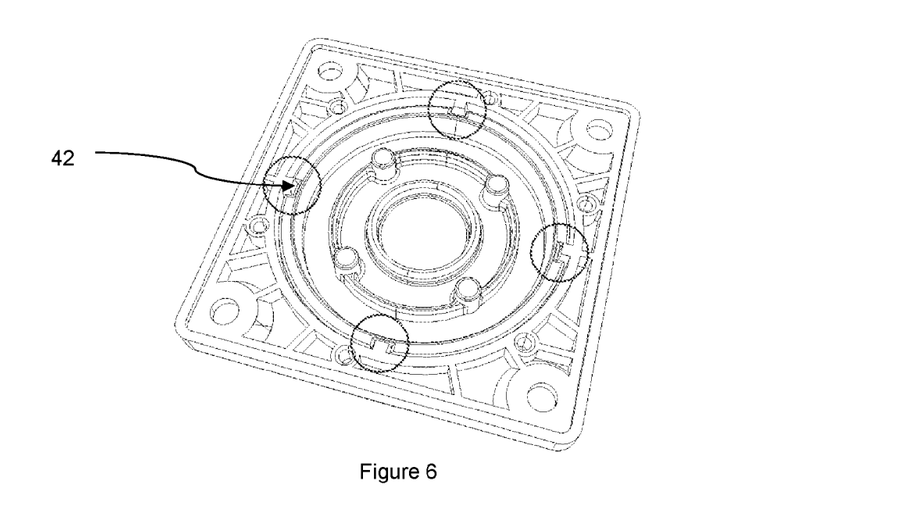
FIG. 6 is a schematic view of a part of an anti-rotation stopper mechanism for an example collision sensor of the present disclosure.

Referring to FIG. 6, the housing of the collision sensor is provided with one or more anti-rotation stoppers 42, preferably 4 anti-rotation stoppers, respectively in form of a peripheral protrusion arranged along the inner periphery of the opening of the housing 40, and the actuator 80 is accordingly provided with one or more notches 86, preferably arranged along the outer periphery of the actuator 80, for engaging with the stoppers to allow only the tilting movement of the actuator and prevent the actuator from effecting a rotational movement while driven by the detection enlargement element. The anti-rotation stopper is relatively rigid to ensure a firm engagement with the notch of the actuator during a collision, so as to overcome a rotational force possibly induced by or resulted from the collision. As a large detection enlargement element or plate could create a relatively large torque to the actuator 80 during a collision, it is desirable to allow the actuator 80 to effect merely and substantially a tilting movement for generating an output indicating the occurrence of the collision.

Figure 7:
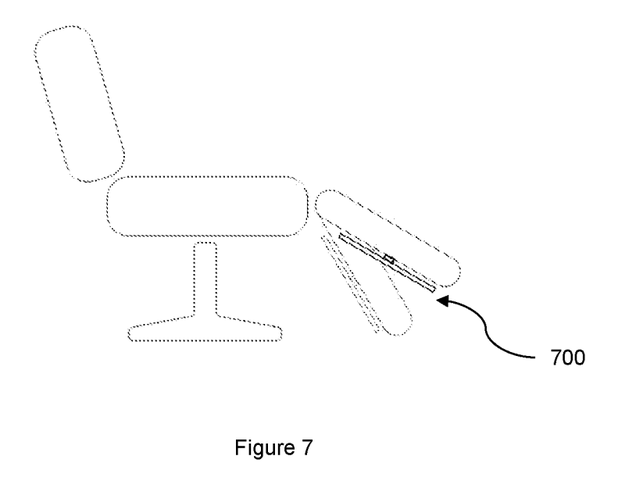
FIG. 7 is a schematic view of a furniture employing an example collision sensor of the present disclosure.

Referring to FIG. 7, the example collision sensor 700 is employed by a reclining chair or sofa with an automatically movable foot rest or back rest. In the embodiment, the collision sensor is mounted at a rear part of the foot rest. While the detection enlargement element is shown as planar and mounted outside the foot rest, it should be appreciated that the collision sensor could be also embedded into the foot rest, where the detection enlargement element could serve as the back plate with a curvature of the foot rest. In addition, the collision sensor could be also mounted on the front part and/or lateral parts of the foot rest, or on all parts thereof.

Figure 8:
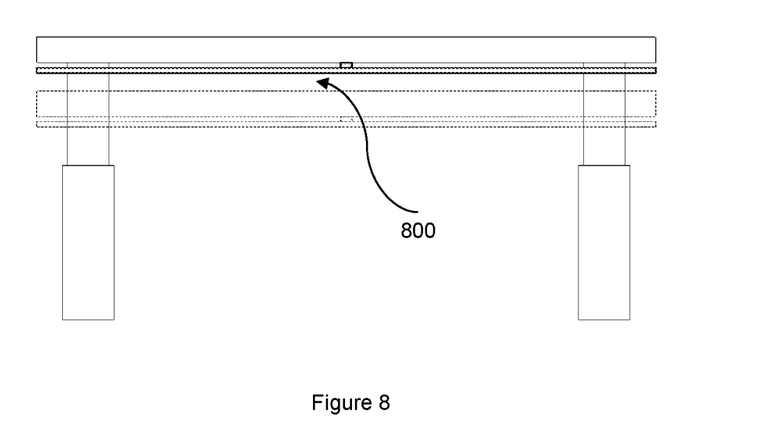
FIG. 8 is a schematic view of another furniture employing an example collision sensor of the present disclosure.

Referring to FIG. 8, the example collision sensor 800 is employed by a height adjustable table with an automatically movable table top. In the embodiment, the collision sensor is mounted under the table top to prevent the table top from damaging the object or hurting children or pets incidentally situated under the table during its downward motion. The collision sensor could be also mounted at any movable window or door of a domestic or commercial furniture or fixture to enhance the safety measures thereof.

The collision sensor of the present disclosure can also be used as an ON/OFF switch featuring an oversize collision or switching detection enlargement element 90 (or an enlarged actuating surface), which is advantageously adapted to serve as a foot step switch, an alarm switch for elderly or disabled persons, or the like, for example.

Features set out in the claims hereto (jointly and severally where appropriate) are to form part of this disclosure and are incorporated herein by reference.

While various examples or embodiments have been described herein, it should be appreciated that they are for illustration and are not for scope restriction. For example, while the housing and the actuator are respectively shown or configured as square/circular in shape in example applications provided herein, other shapes and configurations according to the essence of the present disclosure may be used without loss of generality. It should be appreciated that portions or parts of the various example embodiments can be excerpted for combination and/or mix-and-match where appropriate to form other variants without loss of generality.

The invention claimed is:

1. A collision sensor for detecting a collision between an automatically moveable part of a furniture and an obstacle, comprising:
    a piece of the furniture with at least one moveable part being driven relative to other pieces of the furniture in-a non-manual manner;
    an automatic driving mechanism moving the at least one moveable part;
    a controller controlling the automatic driving mechanism; and
    a sensor comprising:
    a hollow housing formed by injection molding, having a base plate and one or more lateral walls defining an accommodation space;
    a collision information generator arranged in the space and producing an output indicating a directional and/or positioning information of the collision when triggered during the collision; and
    a collision detecting member arranged over the collision information generator and triggering the collision information generator upon being actuated and driven by the obstacle during the collision;
    wherein the collision detecting member and the collision information generator are spaced apart from each other or in contact with each other by one or more resilient members arranged in the space,
    wherein the collision detecting member is switchable between a normal position at which the collision detecting member is spaced apart from or in contact with the collision information generator, and a plurality of working positions at which at least a portion of the collision detecting member is pressed against and triggering the collision information generator by a compressive or collision force originating from the obstacle during the collision,
    and
    wherein the collision sensor is adapted to detect the collision with the obstacle during movement of the moveable part and collect the directional and/or positioning information of the collision and then transmit the output indicating the collision and/or the information to the controller to adjust the automatic driving mechanism when the collision occurs.

2. The collision sensor of claim 1, wherein the collision information generator comprises:
    a printed circuit board assembly mounted on the base plate and provided with one or more conductive members/traces; and
    a key member having one or more deformable contacting portions corresponding to and matching with the conductive members/traces, wherein each of the deformable contacting portions is switchable between a normal state where the contacting portion is spaced apart from respective conductive members/traces, and a deformed state where at least a portion of the contacting portion is deformed to press against and short the respective conductive members/traces by the compressive or collision force originating from the collision with the obstacle to produce the output indicating the directional and/or positioning information of the collision.

3. The collision sensor of claim 1, wherein the collision information generator comprises a printed circuit board assembly mounted on the base plate and provided with one or more tact switches triggerable by the compressive or collision force originating from the collision with the obstacle to produce the output indicating the directional and/or positioning information of the collision.

4. The collision sensor of claim 1, wherein the collision detecting member and/or the collision information generator comprises one or more engagement notches arranged at a periphery for engaging with one or more complementary stoppers arranged in the hollow housing to prevent the collision detecting member and/or the collision information generator from rotating while being subjected to a torque generated by the compressive or collision force originating from the collision with the obstacle.

5. The collision sensor of claim 1, wherein the collision detecting member comprises an enlargement element expands a detection area for collision 2 -40 times or more than an original coverage area of the collision detecting member.

6. The collision sensor of claim 1, wherein the collision detecting member is a circular cover, comprising a circular groove arranged at a periphery of the circular cover to accommodate and engage with one or more resilient members of the collision sensor and circular protrusions for engaging with the collision information generator, and the circular protrusions damming or driving the collision information generator to produce the output indicating the directional and/or positioning information of the collision.

7. The collision sensor of claim 1, wherein the resilient member is a wave spring enclosing the collision information generator.

8. The collision sensor of claim 2, wherein the key member is a silicone rubber key having circular conductive contacting portions arranged at a first side of the key member, and the circular conductive contacting portions being coated with a conductive film for contacting and shorting the respective conductive members/traces; and a central conical portion arranged at a second side of the key member and the central conical portion having an apex engaged with the collision detecting member and/or flushed with an end surface of a wave spring of the collision information generator.

9. The collision sensor of claim 2, wherein the one or more conductive members/traces or tact switches are indexed and/or grouped to correspond to or represent respective zones of the collision detecting member and/or the enlargement element, such that a directional and/or positioning information of the collision could be provided when respective conductive members/traces are shorted or tact switches are triggered.

10. The collision sensor of claim 1, wherein the directional and/or positioning information in the output is based on a non-uniform depression of the collision information generator, the collision information generator having at least one deformable element.

11. The collision sensor of claim 1, wherein the hollow housing is made of injection-molded plastic.

12. The collision sensor of claim 4, wherein the one or more engagement notches prevent rotation by the collision detecting member and/or the collision information generator about a central axis of the collision sensor relative to the hollow housing.

13. The collision sensor of claim 5, wherein the enlargement element is a rectangular, square, polygonal, or circular plate with a planar, concave, or convex surface, the enlargement element being made of thermoformed plastic.

14. The collision sensor of claim 6, wherein the circular cover is made of die-casted zinc alloy.

15. A collision sensor for detecting a collision between an automatically moveable part of a furniture and an obstacle, comprising:
   a piece of the furniture with at least one moveable part being driven relative to other pieces of the furniture in-a non-manual manner;
   an automatic driving mechanism moving the at least one moveable part;
   a controller controlling the automatic driving mechanism; and
   a sensor comprising:
   a hollow housing formed by injection molding, having a base plate and one or more lateral walls defining an accommodation space;
   a collision information generator arranged in the accommodation space and producing an output indicating a directional and/or positioning information of the collision when triggered during the collision; and
   a collision detecting member arranged over the collision information generator and triggering the collision information generator upon being actuated and driven by the obstacle during the collision;
   wherein the collision detecting member and the collision information generator in contact with each other via one or more resilient members arranged in a space separating the collision detecting member and the collision information generator,
   wherein the collision detecting member is switchable between a normal position at which the collision detecting member is in contact with the collision information generator via the one or more resilient members, and a plurality of working positions at which at least a portion of the collision detecting member is pressed against and triggering the collision information generator by a compressive or collision force originating from the obstacle during the collision,
   wherein the directional and/or positioning information in the output is based on a non-uniform depression of the collision information generator deforming the one or more resilient members, and
   wherein the one or more resilient members is a wave spring enclosing the collision information generator, the wave spring providing multi-directional support and deformability to the collision information generator, and
   wherein the collision sensor is adapted to detect the collision with the obstacle during movement of the moveable part and collect the directional and/or positioning information of the collision and then transmit the output indicating the collision and/or the information to the controller to adjust the automatic driving mechanism when the collision occurs.

* * * * *